(12) United States Patent
Voo

(10) Patent No.: US 6,404,290 B1
(45) Date of Patent: Jun. 11, 2002

(54) FAST CHANGE CHARGE PUMP HAVING SWITCHABLE BOOST FUNCTION

(75) Inventor: Thart Fah Voo, Singapore (SG)

(73) Assignee: Marvell International, Ltd., Hamilton (BM)

( * ) Notice: Subject to any disclaimer, the term of this patent is extended or adjusted under 35 U.S.C. 154(b) by 0 days.

(21) Appl. No.: 09/710,256

(22) Filed: Nov. 10, 2000

(51) Int. Cl.[7] .................................................. H03L 7/00
(52) U.S. Cl. .......................................... 331/8; 323/284
(58) Field of Search ....................... 363/60, 59; 331/17, 331/25, 80; 327/156; 323/284, 283

(56) References Cited

U.S. PATENT DOCUMENTS 5,075,640 A * 12/1991 Miyazawa ................... 331/10
6,107,864 A     8/2000 Fukushima et al.
6,222,421 B1 *  4/2001 Kiyose ........................ 331/17
6,249,445 B1 *  6/2001 Sugasawa .................... 363/60

* cited by examiner

Primary Examiner—Shawn Riley
(74) Attorney, Agent, or Firm—Eric B. Janofsky

(57) ABSTRACT

A regulator circuit for providing a regulated voltage, comprises a driver for generating a drive signal, and a charge pump having a first voltage input coupled to a first voltage source, being responsive to the drive signal, to generate a pump voltage from the first voltage source. An amplifier having a reference input is coupled to a reference voltage, a sense input is coupled to a sense signal representative of the pump voltage, and an output is operable in response to a difference between the reference voltage and the sense signal, to control the driver. A switch is coupled from the amplifier output to an output of the charge pump such that the pump voltage is controllably boosted by the amplifier output through the switch.

48 Claims, 6 Drawing Sheets

FAST CHANGE CHARGE PUMP HAVING SWITCHABLE BOOST FUNCTION

BACKGROUND OF THE INVENTION

1. Field of the Invention

The present invention relates generally to charge pump circuits, and in particular to charge pump circuits that provide a regulated output voltage.

2. Discussion of the Related Art

A charge pump circuit is generally used for boosting a power supply voltage to a higher voltage level to be used for powering ancillary circuits. Closed loop control is sometimes used with charge pumps to provide a regulated output voltage. However, charge pumps that include closed loop control typically have extremely slow response times due to the relatively small amount of energy that can be transferred during each clock cycle.

SUMMARY OF THE INVENTION

The present invention provides a circuit and method having a fast response time for generating a regulated voltage from a first voltage of a first voltage source. The circuit includes a driver for generating a drive signal. The driver includes a clock input for receiving a clock signal. A charge pump that has a first voltage input coupled to the first voltage source. In response to the drive signal, the charge pump provides a pump voltage that is boosted from the first voltage. An amplifier has a reference input coupled to a reference voltage, a sense input coupled to a sense signal representative of the pump voltage, and an output. The amplifier is operable in response to a difference between the reference voltage and the sense signal, to control the driver. A switch is coupled from the amplifier output to an output of the charge pump such that the pump voltage is controllably boosted by the amplifier output through the switch.

For a more complete understanding of the invention, its objects and advantages, reference may be had to the following specification and to the accompanying drawings.

BRIEF DESCRIPTION OF THE DRAWINGS

FIG. 3 illustrates an expanded view of the timing diagram illustrated in FIG. 2A:

DETAILED DESCRIPTION OF THE PREFERRED EMBODIMENT

Figure 1:
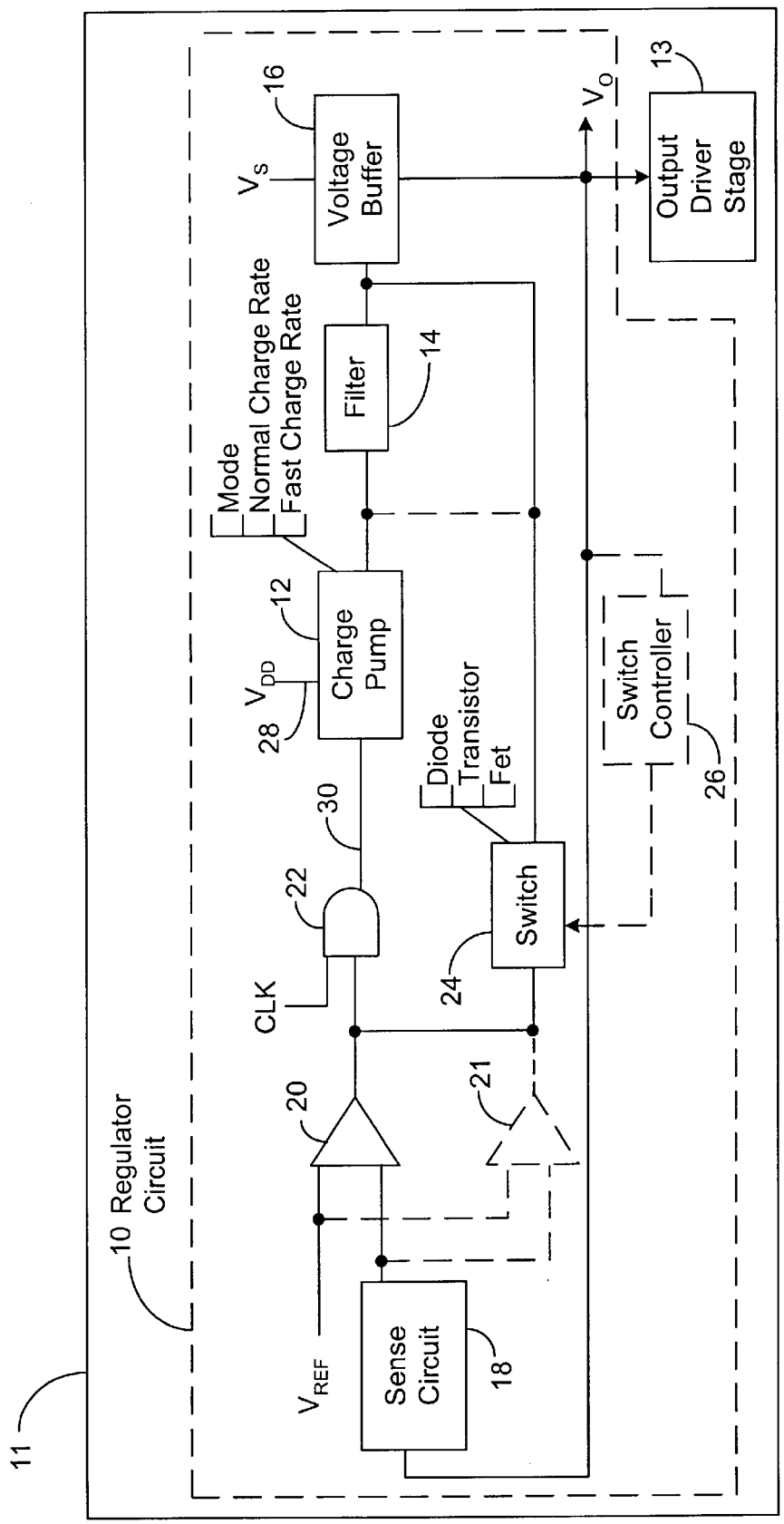
FIG. 1 illustrates a block diagram of a fast change charge pump regulator circuit in accordance with the teachings of the invention.

Referring to FIG. 1, illustrated is a presently preferred embodiment of a fast change charge pump regulator circuit 10 constructed in accordance with the principles of the present invention. The regulator circuit 10 converts power from a voltage source to a regulated output. The present invention is particularly suitable when incorporated into a semiconductor device 11 for providing power to on-chip circuitry such as an output driver stage 13. While the present invention is shown and described as being incorporated into a semiconductor device 11, it will be appreciated that the circuit and method may be embodied in a variety of devices including a combination of discrete devices, an application specific integrated circuit, and a field programmable array. The regulator circuit 10 includes a charge pump circuit 12 for boosting voltage from a voltage source, $V_{DD}$. High frequency components in the boosted voltage are attenuated by a filter 14. The filtered voltage is used to drive a voltage buffer 16 that converts power from another voltage source, $V_S$, to an output voltage, $V_O$, that is proportional to the voltage level of the filtered voltage. A sense circuit 18 couples a voltage corresponding to the output voltage to the input of an amplifier 20. The sense circuit 18 in the preferred embodiment is a direct connection to the output of the voltage buffer 16. However, as those skilled in the art will readily recognize, the scope invention encompasses other sense circuits such as resistor divider networks. The amplifier 20 compares the sense voltage to a reference voltage that is coupled to another input of the amplifier 20. An error signal is generated by the amplifier 20 based upon the comparison of the sense voltage and reference voltage. The output of the amplifier 20 is coupled to a driver 22 and a switch 24. The driver 22 generates a pulsed drive signal to drive the charge pump 12. The driver 22 in the presently preferred embodiment is an AND gate. However, any suitable device for driving the input of the charge pump circuit 12 is within the scope of the invention, such as devices having push-pull and totem-pole outputs. The switch 24 provides a controlled feedforward path during start-up and transient load/line conditions for quickly driving the input to the voltage buffer 16 up to a voltage level that is less than the steady-state boosted voltage. A switch controller 26 may additionally be included. The switch controller 26 controls the operation of the switch 24 based upon a predetermined switching criteria such as the voltage level of the output voltage, the operating mode of the regulator 10, and the duration of operation.

The charge pump circuit 12 boosts power coupled from a voltage source, $V_{DD}$, to a power input 28, up to an unregulated output voltage ranging in value from $V_{DD}$ to $2*V_{DD}$. The operation of the charge pump circuit 12 is controlled by the drive signal which is coupled to a drive input 30. The drive signal is typically a pulsating waveform that alternately causes energy to be cycled into a series capacitor, and then out of the series capacitor into a storage capacitor. The output voltage of conventional charge pump circuits varies with the duty cycle and frequency of the drive input, the voltage level of $V_{DD}$, the voltage level of the driver output, capacitor values, and load. The scope of the invention encompasses using all known unregulated charge pump circuits within the described system and method. Two such conventional charge pump circuits are illustrated in FIGS. 3A and 3B.

Figure 3A:
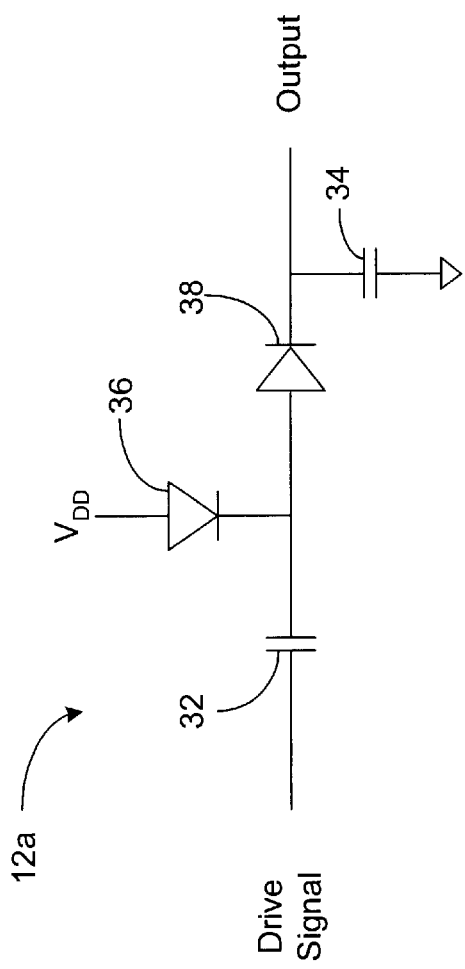
FIG. 3A illustrates a prior art charge pump.

Referring to FIG. 3A, a single stage charge pump circuit 12a is illustrated. The charge pump circuit 12a includes a series capacitor 32, storage capacitor 34, and coupling diodes 36 and 38. In operation, when the drive signal is in the low state, energy from $V_{DD}$ is stored in the series capacitor 32 charging the capacitor 32 up to $V_{DD}$. Then, when the drive signal transitions to the high state, the summation of the energy stored in the series capacitor 32 and energy provided by the drive signal is transferred through the coupling diode 38 charging up the storage capacitor 34. The peak voltage level stored in the storage capacitor 34 is approximately the voltage amplitude of the drive signal plus the voltage of the series capacitor 32. The scope of the invention also includes charge pump circuits that employ mode control circuitry for controlling the charge rate of the charge pump. Mode control circuitry typically consists of a transistor-capacitor series combination that is coupled across either the series capacitor 32 or the storage capacitor 34. The series combination is switched into or out of the circuit to vary the charging rate of the circuit.

Figure 3B:
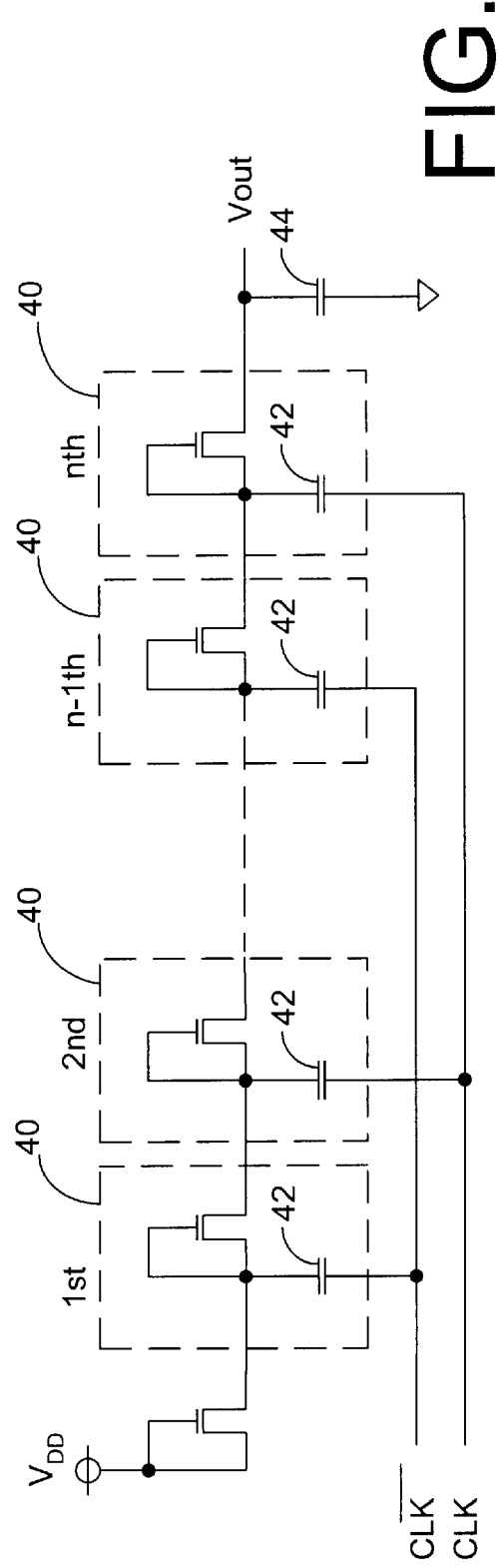
FIG. 3B illustrates another prior art charge pump.

Referring to FIG. 3B, a multistage charge pump circuit 12b is illustrated. The charge pump circuit 12b uses two clock signals to permit multiple boost stages 40 to be series connected. A series capacitor 42 is included in each of the boost stages. A single storage capacitor 44 is coupled to the output of the charge pump circuit 12b.

Again referring to FIG. 1, the filter 14 employed in the presently preferred embodiment is a low pass filter comprised of a resistor and capacitor. Although a discrete capacitor is used, it is within the scope of the invention to use the parasitic capacitance of the voltage buffer 16, or to not include the filter 14. The scope of the invention also includes using other low pass filters such as an inductor-capacitor filter.

In the presently preferred embodiment, the voltage buffer 16 is an NMOS transistor configured as a voltage follower. The scope of the invention additionally includes using other well known voltage buffer circuits such as bipolar transistors configured as voltage followers.

Although a single amplifier 20 is employed to drive both the driver 32 and the switch 24, it is within the scope invention to provide a separate amplifier 21 to drive each device. The separate amplifier 21 may for example be a voltage buffer such as a voltage follower coupled between the output of the amplifier 20 and the switch 24 or the separate amplifier 21 may be coupled from the inputs of the amplifier 20 to the switch 24. Employing a separate amplifier 21 provides design flexibility permitting different voltage levels to be supplied to the amplifier 20 and separate amplifier 21.

The switch 24 in the presently preferred embodiment is an NMOS FET being employed as an active switch that is controlled by the switch controller 26. The scope of the invention encompasses using other active switches such as bipolar transistors, CMOS FETs, and analog muxes. In addition, the scope of the invention includes using passive switches such as diodes. When a diode is used for example, the source voltage to the amplifier 20 is selected to be less than the normal output operating voltage of the charge pump circuit 12, thereby providing a low impedance path for energy to charge the charge pump circuit output to a voltage level below the regulation point.

Figure 2A:
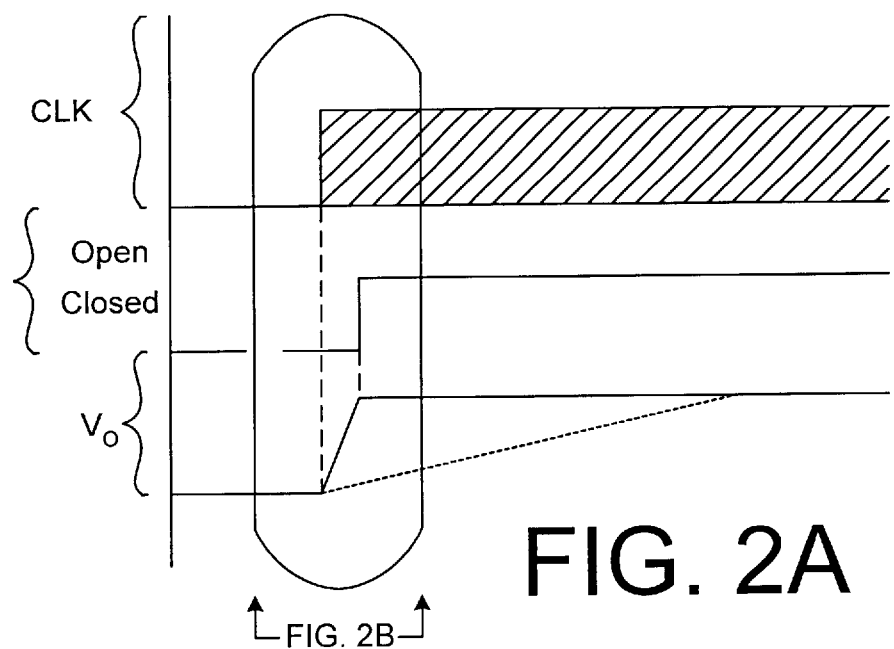
FIG. 2A illustrates a timing diagram associated with a presently preferred embodiment of the invention.

Referring to FIG. 2A, timing waveforms associated with the operation of the regulator circuit 10 are illustrated. At initial turn-on of the regulator 10, the switch controller 26 drives the switch 24 to the closed state. Energy from the amplifier 20 is coupled through the switch 24, directly to the output of the filter 14. The filter output quickly ramps up to a voltage level slightly below the regulation point of the regulator circuit 10. The switch controller 26 then drives the switch 24 to the open state, decoupling the direct connection of the amplifier 20 to the filter output. The output of the filter 14 is then charged up to the regulation point through the combination of the driver 22 and the charge pump circuit 12.

Figure 2B:
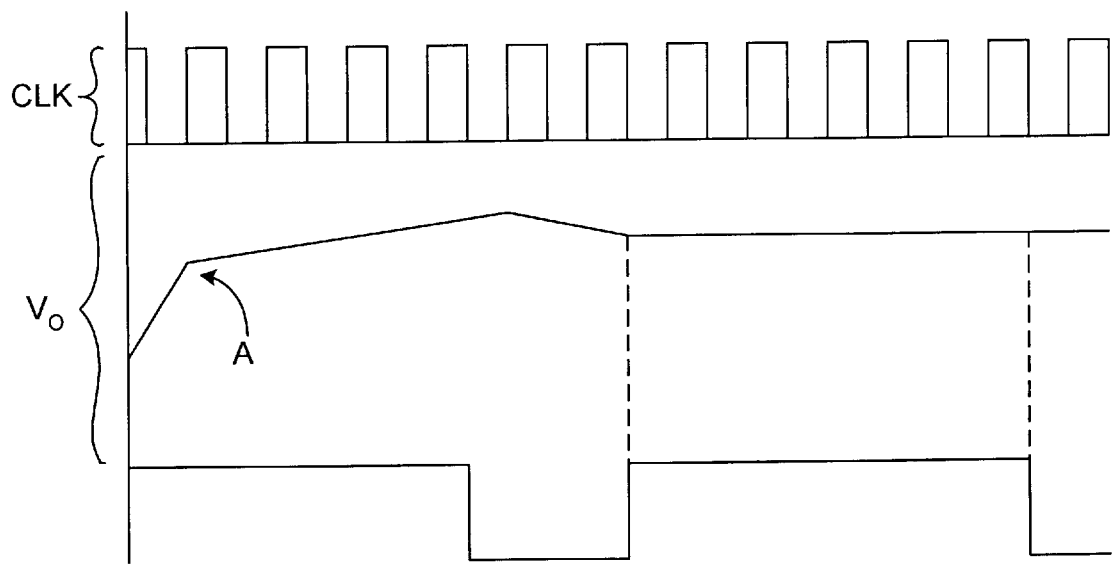

Referring to FIG. 2B, an expanded view of the timing signals illustrated in FIG. 1 is shown. The transition of the output voltage, Vo, from initial start-up mode to steady-state mode operation is shown at point A. During steady-state operation, the driver 22 generates the drive signal in response to an error signal from the amplifier 20, and the clock signal. When the sensed voltage corresponding to Vo is less than the reference voltage, Vref, the error signal is high, causing the driver 22 to enable the driver signal. The active driver signal causes the charge pump circuit 12 to transfer energy to the output, boosting the voltage level of Vo, until the sensed voltage exceeds Vref. When the sensed voltage exceeds Vref, the error signal transitions low, disabling the driver signal, thereby interrupting further boosting of the voltage level of Vo.

Figure 4:
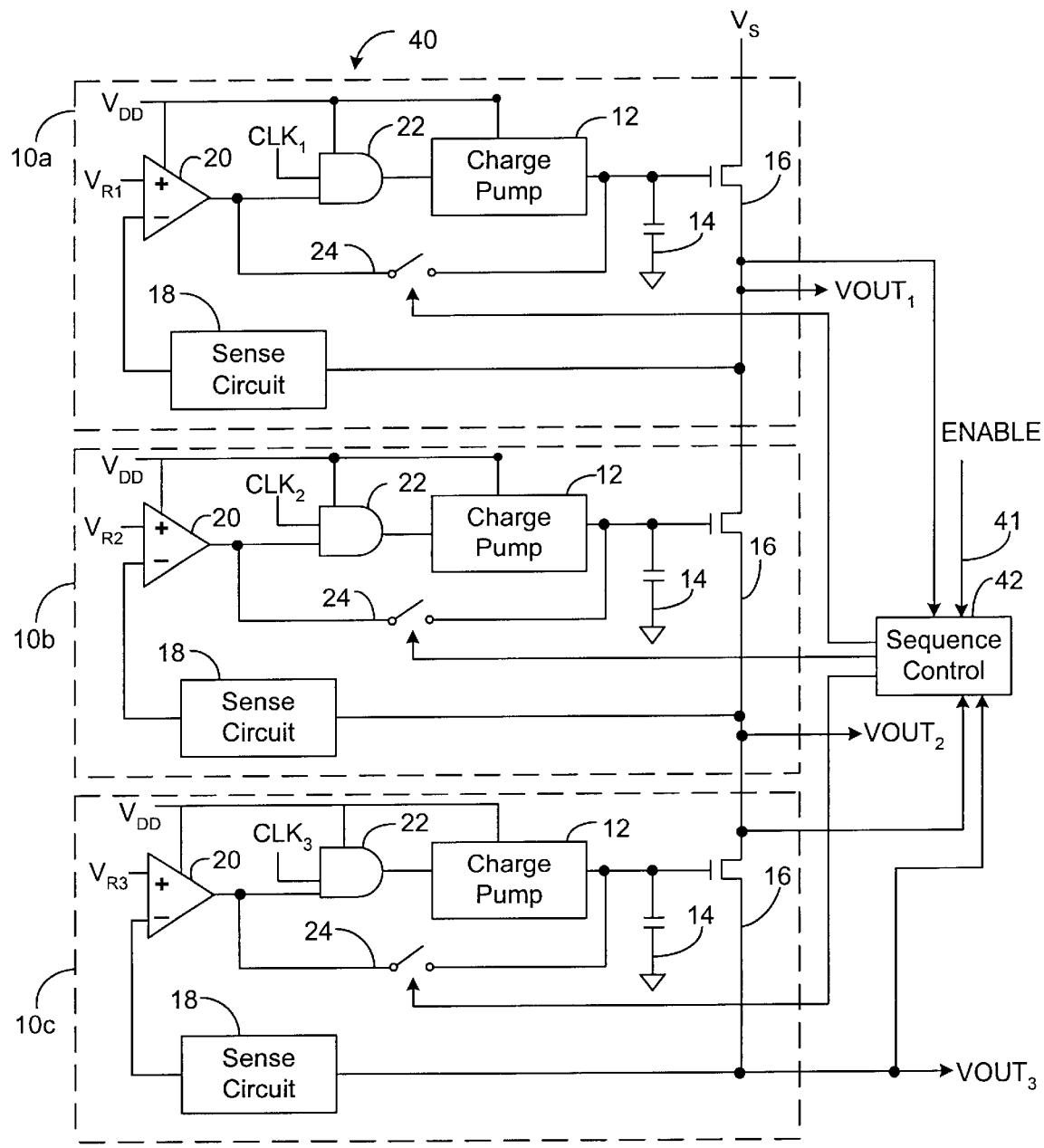
FIG. 4 illustrates a block diagram of an embodiment of a voltage regulating circuit in accordance with the teachings of the invention.

Referring to FIG. 4, a cascode circuit 40 is illustrated. The cascode circuit 40 includes two or more cascode connected regulator circuits 10. In the presently preferred embodiment, three regulator circuits 10 are coupled in the cascode string.

The cascode circuit 40 provides an output voltage, $VOUT_N$, in which the ripple amplitude is reduced. Preferably, the clock signals for the regulator circuits 10 are phase-shifted, so that the ripple voltage from all of the stages does not have a cumulative effect on the output. Phase-shifting the clock signals also increases the ripple frequency, improving the effectiveness of post-filtering that is applied to the output voltages. Also, the cascode circuit 40 may provide intermediate output voltages, $VOUT_n$, from each of the regulator circuits.

A first regulator circuit 10a generates an output voltage, $VOUT_1$, from a supply voltage, Vs. The first regulator circuit 10a is powered from $V_{DD}$. The output voltage, $VOUT_1$, is coupled to a second regulator circuit 10b. The operation of the first regulator circuit 10a is similar to that described above with the addition that the output voltage is cascode connected to the second regulator circuit 10b.

The second regulator circuit 10b uses $VOUT_1$ to supply power to the voltage buffer 16. In a manner similar to the first regulator circuit 10a, the second regulator circuit 10b is powered from $V_{DD}$ and generates an output voltage, in this case $VOUT_2$, from the voltage, $VOUT_1$, supplied to the voltage buffer 16b. In addition, $VOUT_2$ is coupled to a third regulator circuit 10c in the cascode string.

The third regulator circuit 10c, in a manner similar to the operation of the first and second regulator circuits, is powered by $V_{DD}$ and generates an output voltage, in this case, $VOUT_3$, from the voltage supplied to the voltage buffer 16c. The output voltage, $VOUT_3$, is the final regulated voltage from the cascode circuit 40.

Although, in the presently preferred embodiment of the invention each of the regulator circuits is powered from a combination of $V_{DD}$ and Vs, it is within the scope of the invention to provide different interconnect schemes for the output voltages such as powering successive regulator circuits with the voltage generated in the preceding regulator circuit, as well as coupling the output voltage from a successive regulator circuit, back to a preceding regulator circuit.

A sequence control circuit 42 controls the switch 24 in each of the regulator circuits. The outputs from each of the regulator circuits 10, as well as an enable signal 41 are coupled to the sequence control circuit 42. The sequence control circuit 42 opens the switches 24 sequentially based on the voltage level of each output voltage. The scope of the invention also encompasses other criteria for controlling the switches such as the voltage level of a single output voltage, transferred energy, or a time based criteria including delaying a predetermined amount of time after enabling the corresponding switch. In addition, switch control can be executed independently within each regulator circuit. Also within the scope of the invention is using a passive switch such as a diode instead of an active switch.

Figure 5:
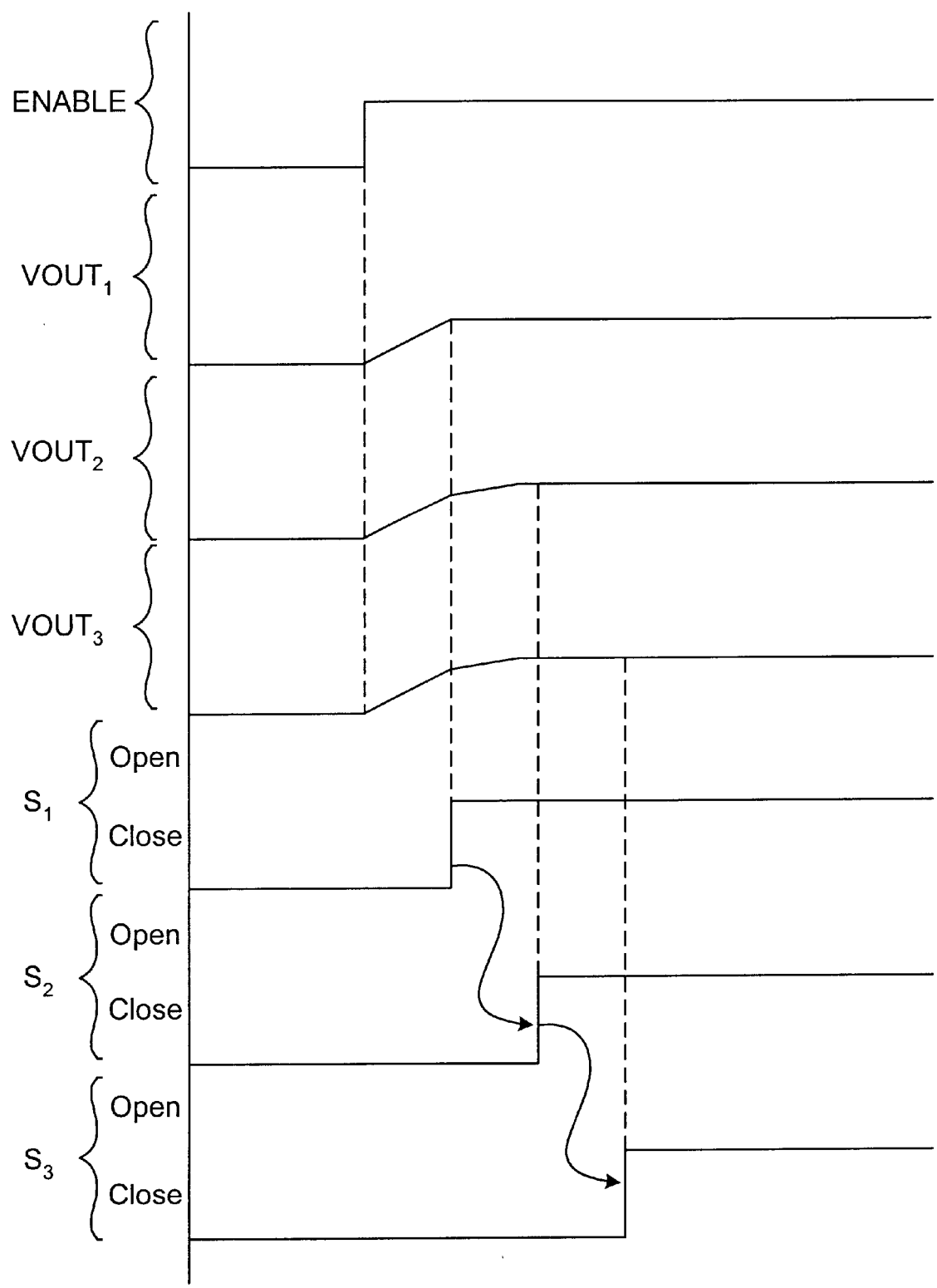
FIG. 5 illustrates a timing diagram associated with another embodiment of the invention.

Referring to FIG. 5, waveforms of signals associated with the cascode circuit 40 are illustrated. The first waveform is the ENABLE signal. The next three waveforms, $VOUT_1$, $VOUT_2$, and $VOUT_3$, illustrate the output voltages of the regulator circuits during start-up of the cascode circuit 40. With specific reference to the waveform of $VOUT_3$, the voltage ramps up at a different rate during each of the four indicated operating states. At initial start-up, $VOUT_3$ ramps up at its fastest rate as each of the regulator circuits is in a fast charge mode. When the first regulator 10a transitions out of the fast charge mode, the rate of change of $VOUT_3$ decreases. Likewise, when the second regulator 10b and the third regulator 10c each transition out of the fast charge mode, the rate of change of $VOUT_3$ again decreases.

Waveforms S1, S2, and S3 illustrate the operation of the switches within the regulator circuits. The sequence control circuit 42 opens each switch as the voltage level for the associated regulator circuit reaches a predetermined level.

Figure 6:
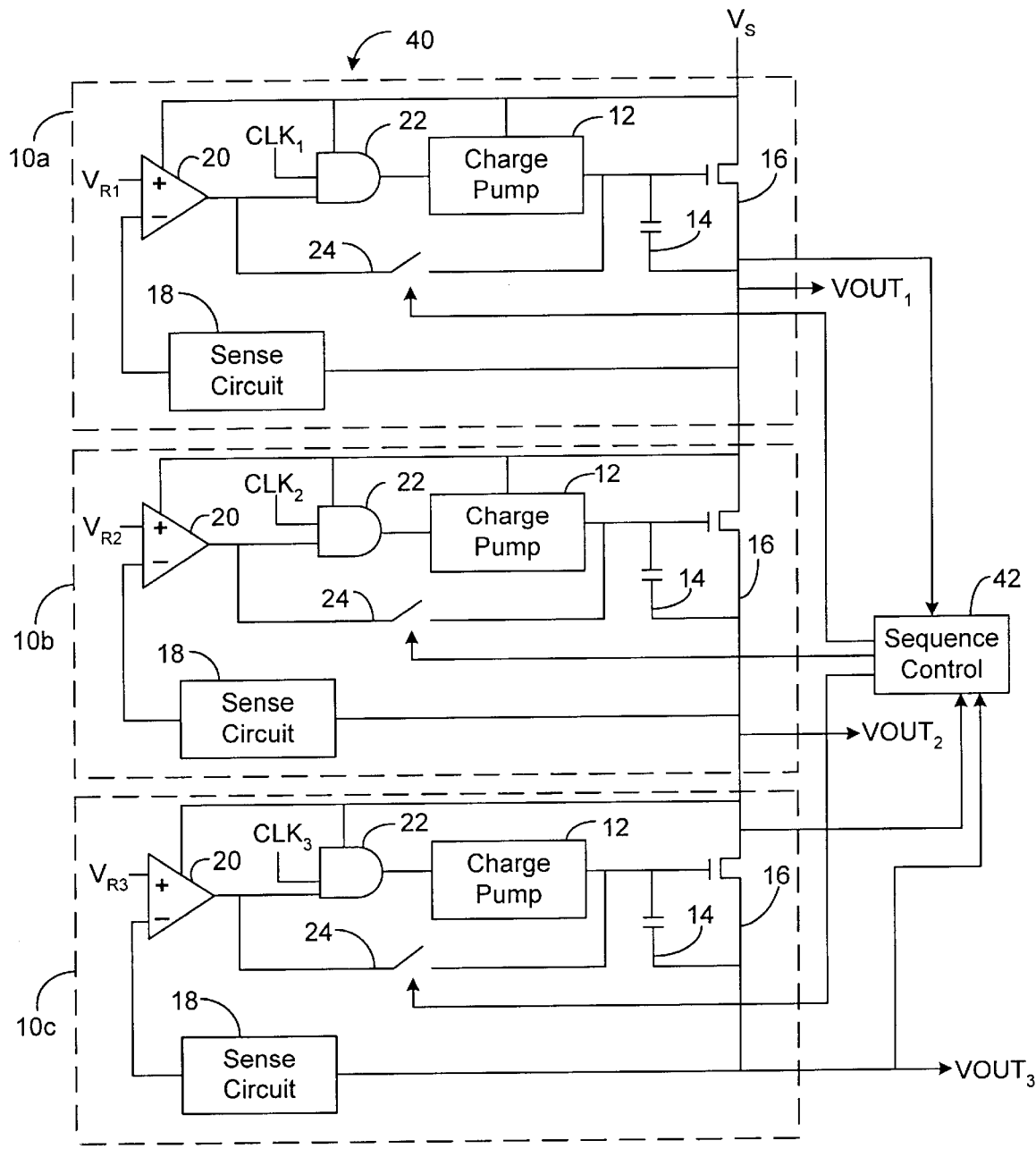
FIG. 6 illustrates a block diagram of an alternative embodiment of a voltage regulating circuit in accordance with the teachings of the invention.

Referring to FIG. 6, another embodiment in accordance with the principles of the invention is illustrated. This embodiment is similar to the cascode circuit 40 with the exception that the second and successive regulator circuits use the output voltage from preceding stages to power the charge pump 12, and the output drive stages of the driver 22 and amplifier 20, as well as the voltage buffer 16. Using this configuration, the voltage level of $VOUT_N$ is not limited by the voltage level of $V_{DD}$. Instead, to obtain higher output voltages, additional regulator circuits 10 are added to the cascode string.

Thus it will be appreciated from the above that as a result of the present invention, a circuit and method for regulating a voltage is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A regulator circuit for providing a regulated voltage, comprising:
    a driver for generating a drive signal;
    a charge pump having a first voltage input coupled to a first voltage source, being responsive to the drive signal, to generate a pump voltage from the first voltage source;
    an amplifier having a reference input coupled to a reference voltage, a sense input coupled to a sense signal representative of the pump voltage, and an output, operable in response to a difference between the reference voltage and the sense signal, to control the driver; and
    a switch being coupled from the amplifier output to an output of the charge pump such that the pump voltage is controllably boosted by the amplifier output through the switch,
    wherein the charge pump further includes a mode control input, operable in response to a mode control signal, to select an operating mode of the charge pump, the operating mode being selected from the group of normal charge rate and fast charge rate.

2. The circuit of claim 1 further including a voltage buffer coupled between a second voltage source and the charge pump output so that an output voltage corresponding to the pump voltage is generated.

3. The circuit of claim 2 further including a sense circuit coupled between the voltage buffer and the amplifier sense input.

4. The circuit of claim 1 wherein the driver further includes a clock input coupled to a clock signal.

5. The circuit of claim 4 wherein the switch is selected from the group of a diode and an active device.

6. The circuit of claim 5 wherein the active device is an NMOS FET.

7. The circuit of claim 5 further including a switch controller, operable in response to a switch control criteria, to control the active device.

8. The circuit of claim 7 wherein the switch control criteria is selected from the group of the pump voltage, the sensed voltage, and a predetermined time delay.

9. A regulator circuit for providing a regulated voltage, comprising:
    driver means for generating a drive signal;
    charge pump means for generating a pump voltage in response to the drive signal;
    amplifier means for controlling the driver means in response to a reference voltage and a sense signal representative of the pump voltage; and
    switch means for providing a path through which the pump voltage is controllably boosted by the amplifier means.

10. The circuit of claim 9 further including voltage buffer means for generating an output voltage corresponding to the pump voltage.

11. The circuit of claim 10 further including sense circuit means for generating the sense signal.

12. The circuit of claim 9 wherein the driver means further includes a clock input coupled to a clock signal.

13. The circuit of claim 12 wherein the switch means is selected from the group of a passive device and an active device.

14. The circuit of claim 13 further including switch controller means for controlling the active device in response to a switch control criteria.

15. The circuit of claim 14 wherein the switch control criteria is selected from the group of the pump voltage, the sensed voltage, and a predetermined time delay.

16. The circuit of claim 9 wherein the charge pump means is operable in response to a mode control signal, to select an operating mode of the charge pump means, the operating mode being selected from the group of normal charge rate and fast charge rate.

17. A method for providing a regulated voltage, comprising:
   (a) generating a drive signal;
   (b) generating a pump voltage in response to the drive signal, the pump voltage being boosted from a first voltage source;
   (c) generating an error signal in response to determining a difference between a reference voltage and a sense signal representative of the pump voltage;
   (d) controlling the drive signal in response to the error signal;
   (e) applying a representation of the error signal to the pump voltage, such that the pump voltage is controllably boosted; and
   (f) selecting an operating mode of step (b), the operating mode being selected from the group of normal charge rate and fast charge rate.

18. The method of claim 17 further including the step of generating an output voltage corresponding to the pump voltage.

19. The method of claim 18 further including the step of generating the sense signal.

20. The method of claim 17 further including the step of providing a clock signal for generating the drive signal.

21. The method of claim 20 wherein the step of applying a representation of the error signal includes actively controlling the application of the error signal to the pump voltage.

22. The method of claim 21 wherein the step of actively controlling further includes applying a switch control criteria.

23. The method of claim 22 wherein the switch control criteria is selected from the group of the pump voltage, the sensed voltage, and a predetermined time delay.

24. A regulator circuit for providing a regulated voltage, comprising:
   a driver for generating a drive signal;
   a charge pump having a first voltage input in communication with a first voltage source, being responsive to the drive signal, to generate a pump voltage from the first voltage source;
   a first amplifier having a first reference input in communication with a reference voltage, a first sense input in communication with a sense signal representative of the pump voltage, and an output, operable in response to a difference between the reference voltage and the sense signal, to control the driver;
   a second amplifier having a second reference input in communication with the reference voltage, a second sense input in communication with the sense signal representative of the pump voltage; and
   a switch being coupled from the second amplifier output to an output of the charge pump such that the pump voltage is controllably boosted by the amplifier output through the switch.

25. The circuit of claim 24 further including a voltage buffer coupled between a second voltage source and the charge pump output so that an output voltage corresponding to the pump voltage is generated.

26. The circuit of claim 25 further including a sense circuit coupled between the voltage buffer and the amplifier sense input.

27. The circuit of claim 24 wherein the driver further includes a clock input coupled to a clock signal.

28. The circuit of claim 27 wherein the switch is selected from the group of a diode and an active device.

29. The circuit of claim 28 wherein the active device is an NMOS FET.

30. The circuit of claim 28 further including a switch controller, operable in response to a switch control criteria, to control the active device.

31. The circuit of claim 30 wherein the switch control criteria is selected from the group of the pump voltage, the sensed voltage, and a predetermined time delay.

32. The circuit of claim 30 wherein the charge pump further includes a mode control input, operable in response to a mode control signal, to select an operating mode of the charge pump, the operating mode being selected from the group of normal charge rate and fast charge rate.

33. A regulator circuit for providing a regulated voltage, comprising:
   driver means for generating a drive signal;
   charge pump means for generating a pump voltage in response to the drive signal;
   first amplifier means for controlling the driver means in response to a reference voltage and a sense signal representative of the pump voltage;
   second amplifier means for amplifying the reference voltage and the sense signal representative of the pump voltage; and
   switch means, responsive to said second amplifier means, for controllably boosting the pump voltage.

34. The circuit of claim 33 further including voltage buffer means for generating an output voltage corresponding to the pump voltage.

35. The circuit of claim 34 further including sense circuit means for generating the sense signal.

36. The circuit of claim 33 wherein the driver means further includes a clock input coupled to a clock signal.

37. The circuit of claim 33 wherein the switch means is selected from the group of a passive device and an active device.

38. The circuit of claim 37 further including switch controller means for controlling the active device in response to a switch control criteria.

39. The circuit of claim 38 wherein the switch control criteria is selected from the group of the pump voltage, the sensed voltage, and a predetermined time delay.

40. The circuit of claim 33 wherein the charge pump means is operable in response to a mode control signal, to select an operating mode of the charge pump means, the operating mode being selected from the group of normal charge rate and fast charge rate.

41. A method for providing a regulated voltage, comprising:
   (a) generating a drive signal;
   (b) generating a pump voltage in response to the drive signal, the pump voltage being boosted from a first voltage source;
   (c) generating a first error signal in response to determining a first difference between a reference voltage and a sense signal representative of the pump voltage;
   (d) generating a second error signal in response to determining a second difference between the reference voltage and the sense signal representative of the pump voltage;
   (e) controlling the drive signal in response to the first error signal; and
   (f) applying a representation of the second error signal to the pump voltage, such that the pump voltage is controllably boosted.

42. The method of claim 41 further including the step of generating an output voltage corresponding to the pump voltage.

43. The method of claim 42 further including the step of generating the sense signal.

44. The method of claim 41 further including the step of providing a clock signal for generating the drive signal.

45. The method of claim 44 wherein the step of applying a representation of the second error signal includes actively controlling the application of the second error signal to the pump voltage.

46. The method of claim 45 wherein the step of actively controlling further includes applying a switch control criteria.

47. The method of claim 46 wherein the switch control criteria is selected from the group of the pump voltage, the sensed voltage, and a predetermined time delay.

48. The method of claim 41 further including the step of selecting an operating mode of step (b), the operating mode being selected from the group of normal charge rate and fast charge rate.

* * * * *